United States Patent Office 3,189,840
Patented June 15, 1965

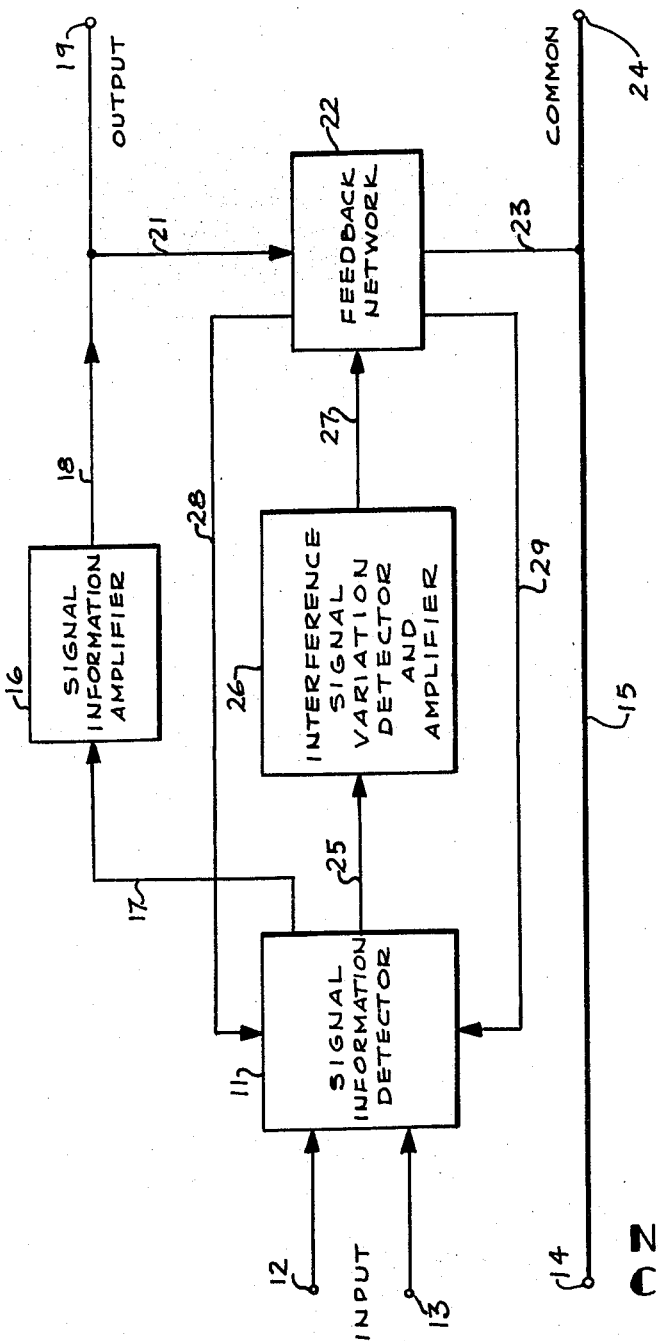

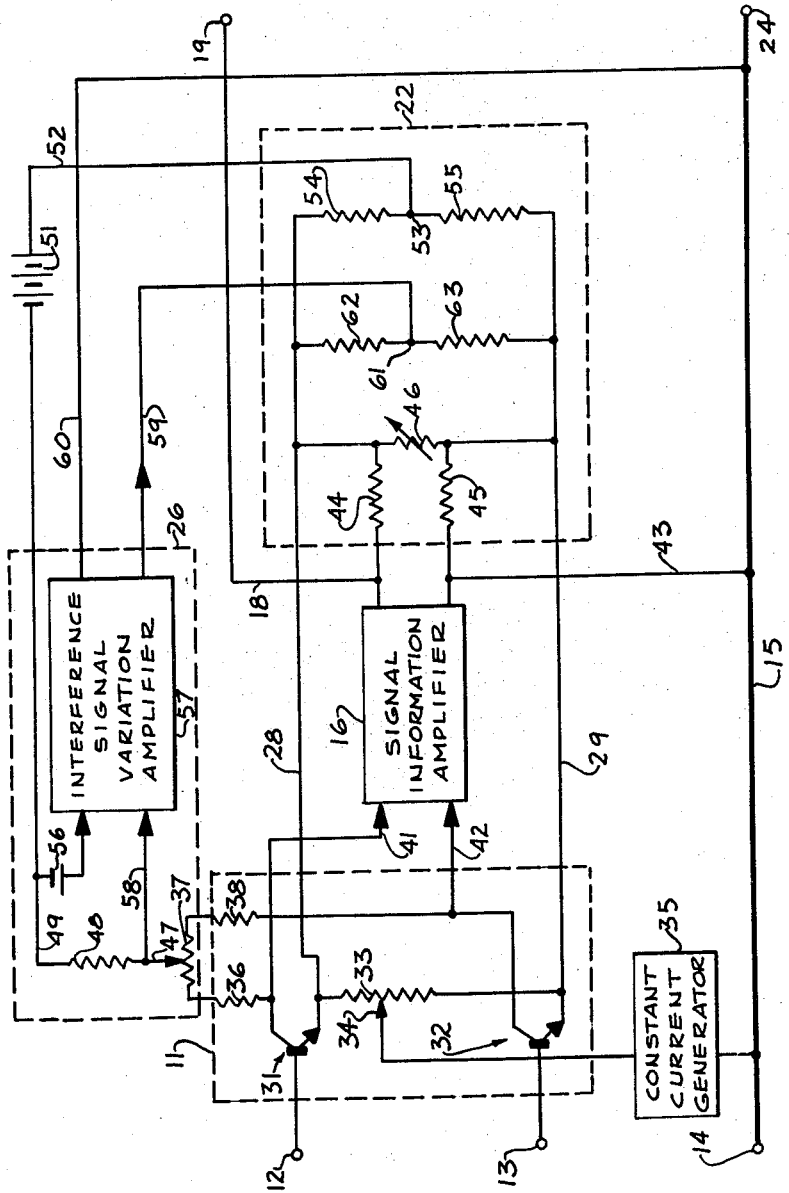

3,189,840
DIRECT COUPLED AMPLIFIER FOR AMPLIFYING LOW LEVEL INFORMATION SIGNALS AND REJECTING INTERFERENCE SIGNALS
Noel B. Braymer, Costa Mesa, and Charles E. Engle, Tustin, Calif., assignors to Dana Laboratories, Inc., Santa Ana, Calif., a corporation of California
Filed Feb. 8, 1963, Ser. No. 257,188
6 Claims. (Cl. 330—25)

This invention relates generally to amplifiers and more particularly to a direct coupled amplifier which is capable of accurately detecting and amplifying low level signal information while at the same time substantially rejecting interference signals particularly those impressed by external influences associated with the signal source or its environment.

In such fields as instrumentation where low level signal information generated by transducers such as thermocouples, strain gauges, or the like, is transmitted over relatively long distances, it has long been recognized that interference signals are generated by such things as differences in soil chemistry, power supplies associated with the transducer, proximate high power equipment, line coupling, and the like. These interference signals appear upon lines conveying the desired signal information to preselected points for analysis and recording. By an interference signal it is meant an unwanted current or voltage signal which is present but does not convey any signal information, but if not compensated for produces an output signal which would thus be an error in signal information.

In using prior art systems when extremely low accuracy of measuring and recording signal information was tolerable (that is, approximately an accuracy of 5%), such things as electrically floating (isolated) galvanometers in conjunction with moving light beam strip recorders could be used. However, now that extreme accuracy (approximately 0.1%) is not only desired but required, other techniques must be utilized.

In an attempt to meet these requirements an amplifier was designed and used in the prior art which employed mechanical choppers to mechanically modulate and demodulate the signal information. Such a unit was successfully utilized for direct current signals in which the amplitude variation was relatively slow. However, any high frequency signal information that was available was lost. These units also from experience prove to be temperature sensitive, to create a great deal of noise as a result of the mechanical contacts, were extremely costly and had a very poor linearity characteristic.

In order to overcome some of the disadvantages of the mechanical chopper type circuits, electronic choppers were substituted for the mechanical choppers. Although some of the disadvantages of the mechanical choppers were eliminated it was still found that the units were extremely costly, that there was an uncertainty in the timing of the chopping operation accomplished by the electronic circuits and that the nonlinearity factor left areas of undesirability. Thereafter a number of variations on Wheatstone bridge circuits were developed in an attempt to overcome some of the disadvantages in the then existing circuits. With the utilization of such circuits it was found that the interference signal was fed through, both as to phase lag and amplitude. That is, the internal rejection of the interference signal within the amplifier was exceedingly difficult to obtain. In addition thereto, as a result of the various components contained within the circuit it was found that it was exceedingly costly to manufacture, that high noise level resulted, and that it became exceedingly difficult to maintain the circuits in the field.

Accordingly it is an object of the present invention to provide an amplifier which readily detects variations of an externally applied interference signal and automatically precludes such variations from appearing as an output signal error.

It is another object of the present invention to provide an amplifier which is rugged, is easily and readily maintained, and is inexpensive to manufacture, as compared to prior art amplifiers.

It is another object of the present invention to provide an amplifier which is very accurate over a relatively wide band of frequencies, including direct current, has a high degree of linearity, a low noise level and a high degree of internal interference signal rejection.

An amplifier in accordance with the present invention includes detector means for sensing signal information and an amplifier which is connected to the detector means for amplifying any signal information that is present at the input to the detector means. Connected between this amplifier and the detector is a feedback circuit that provides negative feedback to the detector. There is also provided an interference signal detector means for sensing variations in the external interference signal that is present. Connected to this interference signal detector is a second amplifier which amplifies the variations in the interference signal. Connected to this second amplifier is an additional feedback means which includes the feedback means above referred to and which is connected between the second amplifier and the signal information detector for stabilizing the operating point of the signal information detector.

More specifically in accordance with the present invention there is provided an amplifier which includes a comparator circuit to which input signals from the signal source are applied. These signals are compared to a feedback potential which is generated as will be indicated more specifically below. The comparator is sensitive to and detects signal information which is then applied to an amplifier the output of which provides signal information for utilization by any desired apparatus. The output signal from the amplifier is also applied to a feedback circuit which is connected to the comparator circuit and operates in the normal negative feedback manner. Also connected to the comparator circuit is a detecting means which is sensitive to changes in the interference signal which is present with signal information upon the input terminals. Connected to this interference signal detecting means is another amplifier which provides an output signal that is proportional to the variations in the interference signal. The output of this second amplifier is in turn connected to the feedback path previously described. This output signal which is fed back to the comparator controls the operating point of the comparator such that it remains substantially stable even though the interference signal applied to the input terminals thereof may fluctuate from time to time. It is in this manner that the feedback signals are generated in order to prevent an output error signal as a result of variations in the interference signal.

Additional objects and advantages of the present invention will become apparent from a consideration of the following description taken in conjunction with the accompanying drawings which are presented by way of example only and are not intended as a limitation upon the scope of the present invention as defined in the appended claims, and in which:

FIG. 1 is a schematic circuit diagram in block form of a direct coupled amplifier in accordance with the present invention; and FIG. 2 is a schematic circuit diagram further illustrating the amplifier of the present invention.

Referring now more particularly to FIG. 1 there is illustrated in block form a direct coupled amplifier in accordance with the present invention. As is therein illustrated, there is provided a signal information detector 11 having a pair of input terminals 12 and 13 connected thereto. The input signal bearing the signal information and the interference signal is applied by way of terminals 12 and 13 from the source, such as a transducer, of such signals to the signal information detector. Also provided is a common terminal 14 which is connected to a common bus or lead 15. A signal information amplifier 16 is also provided and the output of the signal information detector is connected by way of lead 17 as an input to the signal information amplifier 16. The output of the signal information amplifier 16 is applied by way of a lead 18 to an input terminal 19. The output signal from the signal information amplifier 16 is also applied by way of a lead 21 to a feedback network 22. The feedback network 22 is referenced by way of interconnection with lead 23 to the common bus 15, thus causing the output signal from the signal information amplifier 16 to be referenced to the common bus 15 by way of output common terminal 24.

An output from the signal information detector 11 is also applied by way of lead 25 to the interference signal variation detector and amplifier 26. The output of this detector and amplifier is applied by way of lead 27 to the feedback network 22. The feedback signal generated by the feedback network as a result of the outputs from the detector and amplifier 26 and the amplifier 16 being applied thereto is fed back by way of leads 28 and 29 to the signal information detector. In this manner the operating point of the signal information detector is maintained at the desired position in a stable manner, even though the interference signal may vary.

The amplifier in accordance with the present invention is more fully illustrated in the schematic diagram of FIG. 2 to which reference is hereby made. The various portions of the circuit as illustrated in FIG. 1 and above described are indicated by the same reference numerals in FIG. 2 and where applicable are enclosed within dashed lines. As is therein illustrated the signal information detector 11 includes a pair of transistors 31 and 32 each having a collector, an emitter, and a base. The input terminal 12 is connected to the base of transistor 31 while the input terminal 13 is connected to the base of transistor 32. The emitters of the transistors 31 and 32 are interconnected by means of a variable resistor having a resistance element 33 and a movable arm 34. The movable arm 34 is returned through a constant current generator 35 to the common bus 15. The collector of the transistor 31 has a load resistor 36 connected between it and one side of a resistance element 37 of a potentiometer. The collector of the transistor 32 has a load resistor 38 connected between it and the other side of the resistance element 37. The emitter of the transistor 31 is also connected to the first feedback bus 28 while the emitter of the transistor 32 is connected to the second feedback bus 29. The two feedback buses 28 and 29 will be described more in detail below.

The collectors of the transistors 31 and 32 are interconnected by way of leads 41 and 42 respectively to the signal information amplifier 16. The output of the signal information amplifier 16 is connected by way of lead 18 to the output terminal 19. As can be seen the output signal from the amplifier is referenced to the common bus by way of lead 43 which is connected from the amplifier 16 to the common bus 15. The output signal from amplifier 16 is also connected to the feedback network 22. This connection is by way of impedance elements such as resistors 44 and 45. As is seen resistor 44 is connected between lead 18 and feedback bus 28 while resistor 45 is connected between lead 43 and feedback bus 29. As should be apparent at this point the output of the signal information amplifier is taken across leads 18 and 43 or between terminals 19 and 24. A variable resistor 46 is connected between the feedback buses 28, 29 for the purpose of establishing the desired ratio between output and feedback voltage from the signal information amplifier.

Referring now to the interference signal variation detector and amplifier 26, it can be seen that the movable arm 47 in contact with the resistance element 37 is connected through a summing resistor 48 by way of a lead 49 to the negative terminal of a source of potential such as for example a battery 51 which provides collector voltage for the transistors 31, 32. The positive terminal of the battery 51 is connected by way of lead 52 to a common point 53 between a pair of series connected impedance elements such as resistors 54 and 55 which are connected between the feedback buses 28, 29 respectively. A reference potential which is illustrated, by way of example only, as a battery 56 is connected to the lead 49 and operates as one input signal to the interference signal variation amplifier 57. A lead 58 is connected to the movable arm 47 in contact with the resistance element 37 and operates as a second input signal to the amplifier 57. The output of amplifier 57 is provided across leads 59 and 60. Lead 60 is connected to common bus 15 while lead 59 is connected to a common point 61 between impedance elements such as resistors 62 and 63 which are series connected and connected between the feedback buses 28, 29 respectively.

The operation of the circuit illustrated in FIGS. 1 and 2 is as follows. The input signal appearing across the input terminals 12 and 13 incudes two components. One component is an interference signal which is present as a result of the apparatus (not shown) which is used to generate the desired signal or the surrounding environment of the apparatus as above described. The second component of the input signal is any signal information that is generated by the external apparatus and which it is desired to detect and amplify and have appear across output terminals 19, 24. Current flow through the transistors 31 and 32 is adjusted by means of the variable resistors 33 and 37 in such a manner that the base emitter voltage drops thereof are equal. This reduces the temperature drift of the amplifier substantially to zero so that no false or error signal is generated as a result of inherent differences in the construction of the two transistors. This is more fully and thoroughly described in patent application Serial No. 219,592, filed on August 27, 1962, entitled Direct Current Amplifier, and assigned to the assignee of the present application.

Assuming for purposes of discussion that only the first component of the input signal to terminals 12 and 13 appears, that is the external interference signal, and that there is at the moment no variation in such signal, and that there is no information signal applied. Under these conditions a given bias of equal magnitude and the same polarity is applied to the bases of each of the transistors 31 and 32. As above referred to the interference signal is generated as a result of various external and internal influences associated wtih the signal information source such as a transducer. Most such sources are two wire devices and the two wires or conductors are connected to the input terminals 12 and 13 of the amplifier. Since the external, as well as internal, influences associated with the source affect the signal appearing on the two conductors equally, the interference signal when measured with respect to the common bus 15, appears at terminals 12 and 13 in substantialy equal magnitude and of the same polarity at any given instant. The interference signal is generally varying but for purposes of description herein will be taken at certain quiescent conditions.

The bias thus applied to the transistors causes current flow therethrough. The current flow provided therethrough establishes a signal across summing resistor 48 which is applied as an input signal to the amplifier 57. The output of the amplifier 57 is such that a predetermined level of feedback potential is applied to the feedback buses 28 and 29 through the resistors 62 and 63, which is in turn applied to the emitters of the transistors 31 and 32. This establishes the quiescent operating condition of the amplifier and is such that no output signal appears at the output terminals 19, 24.

It will now be assumed that the interference signal which is applied across terminals 12 and 13 increases in amplitude, that is becomes more positive by an equal amount with respect to common lead 15. Under these operating conditions, since transistors 31 and 32 are interconnected as a differential amplifier, no output signal appears across leads 41 and 42 as an input signal to the amplifier 16. However, there is an increase in collector current flowing through transistors 31 and 32 as as result of the increased bias appearing on the bases of these two transistors respecitvely. This increase in current flow is summed by resistor 48 through which the total collector current of transistors 31 and 32 must flow. The resultant signal then appears as a change in the signal appearing on lead 58 and connected as one input terminal to the amplifier 57. Since the signal appearing upon lead 58 is greater than the reference potential established by the battery 56, the amplifier 57 produces an ouput signal appearing across leads 59 and 60 which is increasing in magnitude. The increasing signal appearing across leads 59 and 60 is applied to the common point 61 between the resistors 62 and 63.

Resistors 62 and 63 in accordance with the preferred embodiment of the present invention are chosen to be highly precise, substantially identical resistors, so that the signal appearing at the comomn point 61 therebetween equally divides between resistors 62 and 63 and appears in an equal amount upon the feedback buses 28 and 29. It should, however, be expressly understood that the impedance element pairs such as resistors 54 and 55, 62 and 63, and 44 and 45, may be chosen to have any ratio desired for the particular application.

Since the feedback buses 28 and 29 are each connected to the emitters of the transistors 31 and 32 respectively, the feedback signal which has thus been generated appears as an increase or more positive bias upon each of these two emitters. The increase in the bias upon the emitters of the transistors 31 and 32 is proportional to the increase in the interference signal applied to the bases thereof. This increased bias appearing on the emitters is sufficient to counteract the increase in the interference signal, thus causing the increased collector current to cease flowing. This may be viewed as maintaining the operating point of the detector 11 at a predetermined desired position irrespective of changes occurring in the interference signal.

It should also be noted that simultaneously with the above operation the increase potential appearing upon the feedback buses 28, 29 is also applied to the resistors 54, 55 which again are very identical, high precision, resistors. This in turn causes the common point 53 therebetween to rise in level from the potential at which it was immediately prior to the above operation. As a result of the rise in the potential appearing at the common point 53 between resitsors 54, 55, the potential established by the reference battery 56 and the connector circuit rises a like amount. Therefore any increase or decrease that may appear in the interference signal which is applied to terminals 12 and 13 is reflected in the level at which the reference potential and the signal developed across the summing resistor is applied to the amplifier 57. Therefore, any further change or variation either in an increase or decrease in amplitude of the interference signal is detected at the summing resistor 48, sensed by the amplifier 57 and applied to the feedback buses 28, 29 to effect two separate and distinct operations. The first of these is to prevent a signal from appearing at the output of the transistors 31 and 32 in response to variations in the interference signal appearing at input terminals 12, 13; and the second is to simultaneously cause the reference and summing resistor potentials appearing at the input terminals of the amplifier 57 to assume a level indicative of the momentary potential of the interference signal. By thus varying the level (that is, the reference point) of the reference and summing resistor potentials, momentary discrimination as to variations in the interference signal is possible.

It will now be assumed that the interference signal appearing at terminals 12 and 13 is constant, that is nonvarying, but that there is a change in signal information appearing across the input terminals 12, and 13. For purposes of discussion it will be assumed that the signal appearing at the terminal 12 increases in amplitude with respect to the terminal 13. Under these circumstances the transistor 31 becomes more conductive causing current flow through the collector thereof of a greater magnitude than was the case immediately previous. This increased current flow causes a decreasing voltage signal to appear at lead 41 of the amplifier 16. Since transistors 31 and 32 are interconnected as a differential amplifier, the current flow appearing at the collector of transistor 32 decreases in magnitude as a result of the interconnection of the emitters of the two transistors. This decrease in current flow causes an increase in the voltage signal appearing at lead 42. The difference between the signals appearing across leads 41 and 42 is applied as an input signal to the amplifier 16.

It should be noted that since the current flow through the collector of the transistor 31 has increased and the current flow through the collector of the transistor 32 has decreased, the sum of these currents which appears across summing resistor 48 and at lead 58 of the amplifier 57 does not vary. Thus amplifier 57 in conjunction with the summing resistor 48 does not detect signal information, but only variations in the interference signal.

Returning once again to the amplifier 16 and the signal appearing across leads 41 and 42 thereof, this signal is now sensed by the amplifier 16, is amplified, and appears as an output signal across output leads 19 and 24. Simultaneously therewith the output of amplifier 16 is applied to the feedback buses 28, 29. That is, the output signal from the amplifier 16 is applied through the resistor 44 to the feedback bus 28, thus causing the bias appearing at the emitter of transistor 31 to increase. This increased feedback bias tends to overcome the increased input signal which has been applied to the base of the transistor 31 by way of the input terminal 12, thus tending to return the transistor 31 to a quiescent operating condition.

It should however be noted that the output signal from the amplifier 16 also flows through the variable resistor 46, the resistor 45 and to the amplifier 16. In this manner the increased signal is also applied to the feedback bus 29 and to the emitter of transistor 32. Since the input signal applied by way of the input terminal 13 to the base of the transistor 32 is not increasing but rather has remained unchanging, this increase in feedback signal is not desired. It does however cause a change in the current flowing through the collector circuit of the transistor 32. The change in collector current thus flowing through the transistor 32 is detected by the summing resistor 48 thus setting up a signal appearing at lead 58 which is connected to the amplifier 57, which is indicative of an interference signal variation. Interference signal variation amplifier 57 therefore amplifies this signal and applies it by way of lead 59 to the common point 61 between the identical resistor 62, 63. This feedback signal is then applied to the feedback buses 28, 29 and in this case is negative in amplitude, thus causing the potential appearing upon the feedback buses 28, 29 to return the transistors 31 and 32 to a quiescent condition.

If an input information signal is applied across terminals 12 and 13 which is opposite to the signal above assumed, the operation of the circuit as above described is substantially identical with the exception that some of the various polarities and circuit functions referred to are reversed.

Although the above description of the amplifier, of the present invention has been given by taking a specific set of conditions and varying one thereof, it should be expressly understood that the conditions are all dynamic. That is, the above operational circumstances are taking place continuously to remove effects in the output signal which otherwise would result from interference signal variation (that is, the departure of the interference signal from a predetermined reference point which reference point also varies with respect to the immediately previous amplitude level thereof).

The interference signal variation amplifier 57 and the signal information amplifier 16 may be any standard form of amplifier which is desired but preferably are transistorized differential amplifiers of the type well known in the prior art. Therefore, no detailed discussion will be entered into with respect to these amplifiers.

Although the collector voltage supply has been illustrated as being a battery 51 and the reference potential for the interference signal variation amplifier has been indicated as being a battery 56, it should be expressly understood that these potentials may be generated in any manner which is desired and need not necessarily be by way of batteries as is illustrated.

The amplifier in accordance with the present invention as above described and illustrated in the drawing has proven to be an exceptionally stable amplifier having an exceedingly low noise level and a very high degree of inherent interference signal rejection. The amplifier of the present invention is also capable of amplifying signals which have a very wide band of frequencies, varying for example from direct current to approximately 20,000 cycles per second, while the linearity of the amplifier is plus or minus 0.01% from direct current to approximately 60 cycles per second.

Since there are no moving parts a very low noise level is present within the amplifier in accordance with the present invention and there is little or no maintenance required thereon.

There has thus been disclosed a direct coupled amplifier which is capable of readily discriminating between interference signal variations and signal information that is applied thereto and which amplifier is relatively inexpensive, is rugged, and easily maintained.

What is claimed is:

1. In a direct coupled amplifier having a differential first stage including a pair of transistors each having an emitter, a base and a collector, an interference signal rejection circuit including
   amplifier means having first and second input terminals and first and second output terminals;
   a source of potential;
   means connecting said source of potential to said first input terminal of said amplifier;
   means for detecting changes in the sum of the currents flowing through said transistors connected to said second input terminal of said amplifier thereby to apply a potential indicative of said sum of currents to said second input terminal; and
   feedback means connected between said first output terminal of said amplifier means and said first stage;
   said second output terminal being connected to common,
   said amplifier means being responsive only to differences between the potential applied to said input terminals to provide an output signal effective to change said sum of currents thereby to cause the potential at said first and second input terminals to become substantially equal.

2. In a direct coupled amplifier having a differential first stage including a pair of transistors each having an emitter, a base and a collector, said collectors being connected together through individual load elements, an interference signal rejection circuit including
   amplifier means having first and second input terminals and first and second output terminals;
   a source of potential;
   means connecting one terminal of said source of potential to said first input terminal of said amplifier;
   a summing resistance connected between the common point between said load elements and the other terminal of said source of potential;
   said second input terminal being connected to said common point thereby to apply a potential indicative of said sum of currents to said second input terminal; and
   feedback means connected between said first output terminal of said amplifier means and said first stage;
   said second output terminal being connected to common,
   said amplifier means being responsive only to differences between the potential applied to said input terminals to provide an output signal effective to change said sum of currents thereby to cause the potential at said first and second input terminals to become substantially equal.

3. A circuit as defined in claim 2 wherein said feedback means is a pair of series connected resistive impedance elements connected across said emitters and said first output terminal is connected to the junction point between said pair of resistive impedance elements.

4. In a direct coupled amplifier having a differential first stage including a pair of transistors each having an emitter, a base and a collector, said collectors being connected together through individual load elements, an interference signal rejection circuit including
   amplifier means having first and second input terminals and first and second output terminals;
   a source of potential;
   means connecting one terminal of said source of potential to said first input terminal of said amplifier;
   a summing resistance connected between the common point between said load elements and the other terminal of said source of potential;
   said second input terminal being connected to said common point thereby to apply a potential indicative of said sum of currents to said second input terminal;
   first feedback means connected between said first output terminal of said amplifier means and said first stage; and
   second feedback means including said first feedback means connected between said first output terminal of said amplifier means and said other terminal of said source of potential;
   said second output terminal being connected to common.

5. A circuit as defined in claim 4 in which said first and second feedback means each includes a pair of series connected resistors connected across said emitters of said transistors, said first output terminal of said amplifier means being connected to the junction between the resistors of said first feedback means and further includes means connecting the junction point between said resistors in said second feedback means to said other terminal of said source of potential.

6. A circuit as defined in claim 5 in which the resistors in said first feedback means are substantially equal to each other and the resistors in said second feedback means are substantially equal to each other.

References Cited by the Examiner

UNITED STATES PATENTS 3,046,487   7/62   Matzen et al. _____ 330—30 X

ROY LAKE, *Primary Examiner.*